United States Patent
Sumiya et al.

(10) Patent No.: US 12,391,552 B2
(45) Date of Patent: Aug. 19, 2025

(54) POLYCRYSTALLINE CUBIC CRYSTAL BORON NITRIDE AND TOOL

(71) Applicant: SUMITOMO ELECTRIC INDUSTRIES, LTD., Osaka (JP)

(72) Inventors: Hitoshi Sumiya, Osaka (JP); Yuh Ishida, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 696 days.

(21) Appl. No.: 17/762,072

(22) PCT Filed: Jul. 20, 2020

(86) PCT No.: PCT/JP2020/028038
§ 371 (c)(1),
(2) Date: Mar. 20, 2022

(87) PCT Pub. No.: WO2021/059700
PCT Pub. Date: Apr. 1, 2021

(65) Prior Publication Data
US 2022/0371891 A1   Nov. 24, 2022

(30) Foreign Application Priority Data
Sep. 25, 2019  (JP) ................. 2019-174432

(51) Int. Cl.
| | |
|---|---|
| *B23B 27/14* | (2006.01) |
| *C01B 21/04* | (2006.01) |
| *C01B 21/064* | (2006.01) |
| *C04B 35/5831* | (2006.01) |
| *B23C 5/16* | (2006.01) |

(52) U.S. Cl.
CPC .......... *C01B 21/064* (2013.01); *B23B 27/148* (2013.01); *C04B 35/5831* (2013.01); *B23B 27/14* (2013.01); *B23B 2226/125* (2013.01); *B23C 5/16* (2013.01); *C01P 2002/76* (2013.01); *C01P 2004/03* (2013.01); *C01P 2004/54* (2013.01); *C01P 2004/64* (2013.01); *C01P 2006/90* (2013.01); *C04B 2235/386* (2013.01)

(58) Field of Classification Search
CPC ..... C01B 21/064; B23B 27/148; B23B 27/14; B23B 2226/125; B23B 27/20; C04B 35/5831; C04B 2235/386; C04B 2235/6567; C04B 2235/723; C04B 2235/767; C04B 2235/781; C04B 2235/87; C04B 2235/96; C04B 35/645; C04B 2235/78; C04B 2235/782; C04B 2235/785; B23C 5/16; C01P 2002/76; C01P 2004/03; C01P 2004/54; C01P 2004/64; C01P 2006/90; C30B 29/403
See application file for complete search history.

(56) References Cited

U.S. PATENT DOCUMENTS

| | | | |
|---|---|---|---|
| 2015/0298290 A1* | 10/2015 | Ishida | B24D 18/0009 51/307 |
| 2018/0029942 A1 | 2/2018 | Ishida et al. | |
| 2019/0248652 A1 | 8/2019 | Ishida | |
| 2020/0340139 A1 | 10/2020 | Sumiya | |

FOREIGN PATENT DOCUMENTS

| | | |
|---|---|---|
| CN | 107207364 A | 9/2017 |
| JP | H11-246271 A | 9/1999 |
| JP | 2015-205789 A | 11/2015 |
| JP | 2019-85329 A | 6/2019 |
| WO | 2020/017040 A1 | 1/2020 |

OTHER PUBLICATIONS

Ichida, Yoshio et al., Synthesis of coarse-grain-dispersed nano-polycrystalline cubic boron nitride by direct transformation under ultrahigh pressure, Diamond & Related Materials, 2017, vol. 77, pp. 25-34 (Year: 2017).*

Ichida Yoshio et al., Synthesis of ultrafine nano-polycrystalline cubic boron nitride by direct transformation under ultrahigh pressure, Journal of the European Ceramic Society, 2018, vol. 38 ,pp. 2815-2822 (Year: 2018).*

Ichida Yoshio et al., Synthesis of coarse-grain-dispersed nano-polycrystalline cubic boron nitride by direct transformation under ultrahigh pressure, Diamond & Related Materials, 2017, vol. 7 7, pp. 25-34.

Ichida Yoshio et al., Synthesis of ultrafine nano-polycrystalline cubic boron nitride by direct transformation under ultrahigh pressure, Journal of the European Ceramic Society, 2018, vol. 38, pp. 2815-2822.

* cited by examiner

*Primary Examiner* — Bryan D. Ripa
*Assistant Examiner* — Marites A Guino-O Uzzle
(74) *Attorney, Agent, or Firm* — Renner, Otto, Boisselle & Sklar, LLP

(57) ABSTRACT

A polycrystalline cubic boron nitride includes a cubic boron nitride particle group. The ratio of a second length to a first length is 0.99 or less. Here, each of the first length and the second length is a value measured on a surface of the polycrystalline cubic boron nitride with an indentation formed by a Knoop hardness test under conditions specified in ISO4545-1 and ISO4545-4. The second length represents the length of the longer diagonal of the indentation. The first length represents the sum of the second length and the length of the streaky indentation.

11 Claims, 4 Drawing Sheets

POLYCRYSTALLINE CUBIC CRYSTAL BORON NITRIDE AND TOOL

TECHNICAL FIELD

The present disclosure relates to a polycrystalline cubic boron nitride and a tool. This application claims priority based on Japanese Patent Application No. 2019-174432, filed on Sep. 25, 2019. All the contents of the Japanese patent application are incorporated herein by reference.

BACKGROUND ART

Japanese Patent Laying-Open No. 11-246271 (PTL 1) discloses a cubic boron nitride sintered material that contains substantially no binder.

CITATION LIST

Patent Literature

PTL 1: Japanese Patent Laying-Open No. 11-246271

SUMMARY OF INVENTION

The polycrystalline cubic boron nitride in an aspect of the present disclosure includes a cubic boron nitride particle group. A ratio of a second length to a first length is 0.99 or less.

Here, each of the first length and the second length is a value measured on a surface of the polycrystalline cubic boron nitride with an indentation formed by a Knoop hardness test under conditions specified in ISO4545-1 and ISO4545-4.

The test force of the Knoop hardness test is 4.9 N.

The second length represents the length of the longer diagonal of the indentation.

The first length represents the sum of the second length and the length of a streaky indentation.

The streaky indentation extends from both ends of the diagonal toward the outside of the indentation.

The length of the streaky indentation is measured by observing the surface of the polycrystalline cubic boron nitride with a field emission scanning electron microscope at a magnification of no less than 5000 times and no more than 10000 times.

The second length is measured by observing the surface of the polycrystalline cubic boron nitride with an optical microscope at a magnification of no less than 500 times and no more than 1000 times.

DETAILED DESCRIPTION

Figure 1:
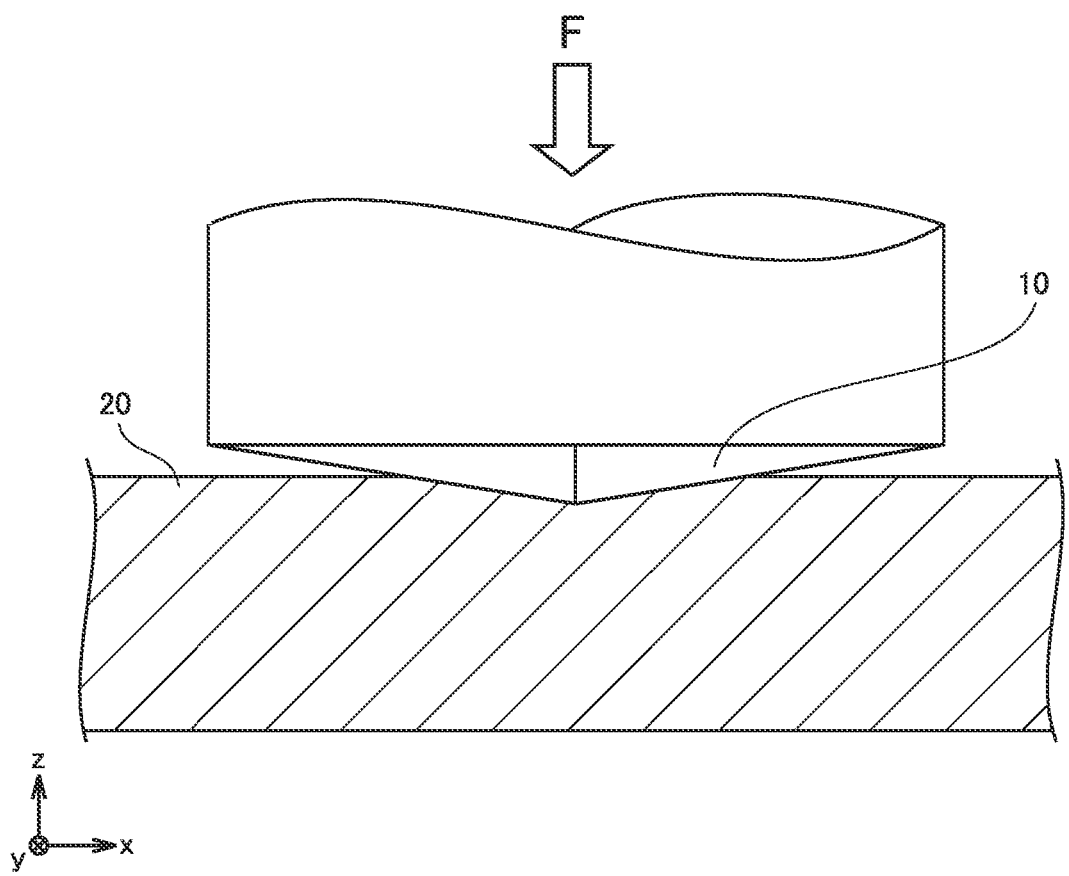
FIG. 1 is a schematic cross-sectional view for illustrating a Knoop hardness test.

Problem to be Solved by the Present Disclosure

A cubic boron nitride (cBN) particle has high hardness next to a diamond particle. A cBN sintered material can be formed by sintering a mixture of a cBN particle group (an aggregate of cBN particles) and a binder. The cBN sintered material is used, for example, for a cutting tool. The cutting tool containing the cBN sintered material is suitable, for example, for processing iron-based materials. The reason is that the reactivity between the cBN particle and the iron-based material is low.

In a cBN sintered material, the binder has a role in binding the cBN particles to each other. The binder may include, for example, a ceramic material such as titanium nitride (TiN) and titanium carbide (TiC). The binder can be softer than the cBN particle. Therefore, the binder can also be a factor for reducing the hardness of a cBN sintered material.

A binderless cBN sintered material has also been developed. The binderless cBN sintered material contains substantially no binder. Hereinafter, the binderless cBN sintered material is herein referred to as "polycrystalline cubic boron nitride (polycrystalline cBN)". The polycrystalline cBN is distinguished from a cBN sintered material containing a binder.

The polycrystalline cBN is produced by a "direct conversion sintering method". In the direct conversion sintering method, for example, hexagonal boron nitride (hBN) in normal pressure phase is used as a starting material. Under ultra-high pressure and ultra-high temperature, the starting material (normal pressure phase) is directly converted into the cBN particle group (high pressure phase), and the cBN particle group is sintered. Thereby, the polycrystalline cBN can be synthesized.

In a polycrystalline cBN, cBN particles are directly bonded to each other. The polycrystalline cBN can have more excellent hardness than a cBN sintered material. The reason is presumed that the polycrystalline cBN contains substantially no binder.

However, there is room for improvement in crack resistance of polycrystalline cBN. In other words, the polycrystalline cBN tends to crack easily when a load is applied. Therefore, for example, in the case of using the polycrystalline cBN as the cutting edge of a cutting tool, the cutting edge may chip easily.

An object of the present disclosure is to provide a polycrystalline cBN having excellent crack resistance.

Description of Embodiments of the Present Disclosure

First, embodiments of the present disclosure are listed. The embodiments of the present disclosure are described.

[1] The polycrystalline cubic boron nitride in an aspect of the present disclosure includes a cubic boron nitride particle group. The ratio of a second length to a first length is 0.99 or less.

Here, each of the first length and the second length is a value measured on the surface of the polycrystalline cubic boron nitride with an indentation formed by a Knoop hardness test under conditions specified in ISO4545-1 and ISO4545-4.

The test force of the Knoop hardness test is 4.9 N.

The second length represents the length of the longer diagonal of the indentation.

The first length represents the sum of the second length and the length of a streaky indentation.

The streaky indentation extends from both ends of the diagonal toward the outside of the indentation.

The length of the streaky indentation is measured by observing the surface of the polycrystalline cubic boron nitride with a field emission scanning electron microscope at a magnification of no less than 5000 times and no more than 10000 times.

The second length is measured by observing the surface of the polycrystalline cubic boron nitride with an optical microscope at a magnification of no less than 500 times and no more than 1000 times.

A polycrystalline cBN is formed of a hard cBN particle group. It is conventionally presumed that a polycrystalline cBN has a very low elastic limit. For example, conventionally, in the Knoop hardness test, elastic deformation of a polycrystalline cBN has been hardly observed.

It is presumed that the polycrystalline cBN of the present disclosure has a higher elastic limit than a conventional polycrystalline cBN. The "ratio of a second length (d2) to a first length (d1), i.e. (d2/d1)" is an index value indicating the level of the elastic limit. It is presumed that the smaller the ratio (d2/d1) is, the higher the elastic limit is.

In the polycrystalline cBN in the present disclosure, ratio (d2/d1) is 0.99 or less. With ratio (d2/d1) of 0.99 or less, the crack resistance can be improved. On the other hand, with ratio (d2/d1) of more than 0.99, sufficient crack resistance cannot be expected.

When a load is applied to the surface of a polycrystalline cBN, a tensile stress may be generated inside the polycrystalline cBN. It is presumed that the tensile stress causes micro destruction, so that a crack occurs. It is presumed that the polycrystalline cBN in the present disclosure has a high elastic limit. In other words, it is presumed that the elastic range is wide in the stress-strain curve. When a load is applied to the surface of the polycrystalline cBN, the stress concentration can be relaxed due to the wide range in which the polycrystalline cBN can be elastically deformed. As a result, it is presumed that the occurrence of cracks is reduced.

Due to improvement in the crack resistance, for example, in the case of using the polycrystalline cBN as the cutting edge of a cutting tool, reduction of chipping of the cutting edge can be expected.

[2] The first Knoop hardness calculated from the first length may be, for example, 40 GPa or more and less than 54 GPa. Thereby, for example, the performance of a cutting tool including a polycrystalline cBN may be improved.

[3] The cubic boron nitride particle group may have, for example, an average particle size of 100 nm or less. Thereby, for example, improvement in the crack resistance in a polycrystalline cBN can be expected.

[4] The tool of the present disclosure includes the polycrystalline cubic boron nitride described in any one of the above [1] to [3]. The tool of the present disclosure may have excellent performance by including the polycrystalline cBN.

Advantageous Effect of the Present Disclosure

According to the above, a polycrystalline cBN having excellent crack resistance is provided.

DESCRIPTION OF EMBODIMENTS

Hereinafter, embodiments of the present disclosure (hereinafter referred to as "the present embodiment") will be described in detail. However, the following description does not limit the claims.
<Polycrystalline cBN>
The polycrystalline cBN in the present embodiment contains a cBN particle group. The polycrystalline cBN may consist essentially of the cBN particle group. The polycrystalline cBN containing substantially no binder is expected to have improved hardness. In some embodiments, the polycrystalline cBN may contain substantially no binder and no sintering aid (catalyst).

Different from a single crystal cBN, a polycrystalline cBN is an aggregate of a plurality of particles. Therefore, it is presumed that a polycrystalline cBN has substantially no anisotropy. It is also presumed that a polycrystalline cBN has substantially no cleavage. It is presumed that a polycrystalline cBN can have isotropic hardness. It is presumed that a polycrystalline cBN may also have isotropic abrasion resistance.

(Index Value of Elastic Limit)

It is presumed that the polycrystalline cBN in the present embodiment has a high elastic limit. In the present embodiment, the ratio of a second length (d2) to a first length (d1), i.e. (d2/d1), is used as an index value of the elastic limit.

Ratio (d2/d1) is measured at the indentation formed by the Knoop hardness test and the surrounding thereof. The Knoop hardness test in the present embodiment is performed under the conditions specified in the international standards "ISO4545-1 and ISO4545-4". Incidentally, the international standards "ISO4545-1 and ISO4545-4" correspond to the Japanese Industrial Standards "JIS Z 2251: 2009".

A micro hardness tester is prepared. Generally, a micro hardness tester is equipped with an optical microscope.

FIG. 1 is a schematic cross-sectional view for illustrating a Knoop hardness test.

An indenter 10 is prepared. The shape of indenter 10 is a quadrangular pyramid. The bottom of the quadrangular pyramid is in a rhombic shape. Indenter 10 is made of diamond.

The test temperature is within the range of 23° C.±5° C. A test piece 20 of the polycrystalline cBN is prepared. Test piece 20 may be processed into a shape and size suitable for the test. Test piece 20 is disposed on the stage of the micro-hardness tester. Indenter 10 comes into contact with the surface of test piece 20. After the contact, a test force (F) is applied in the direction perpendicular to the surface of test piece 20. The test force is 4.9 N. The holding time period of the test force is 10 s (10 seconds).

After the holding time period, the test force is released. After release of the test force, the surface of test piece 20 is observed with an optical microscope at a magnification of no less than 500 times and no more than 1000 times.

Figure 2:
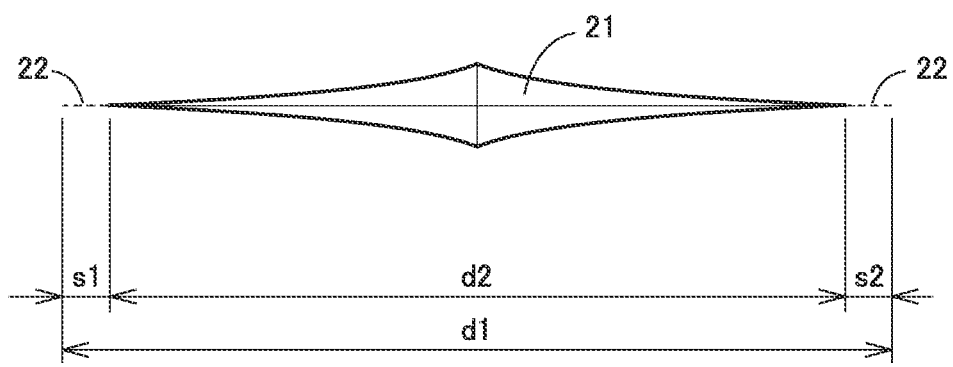
FIG. 2 is a schematic plan view for illustrating an indentation and a streaky indentation.
Figure 2:
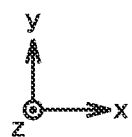

FIG. 2 is a plan view for illustrating an indentation and a streaky indentation.

The xy plane in FIG. 2 corresponds to a microscopic image when the surface of the polycrystalline cBN is observed from the z-axis direction. In other words, the xy plane in FIG. 2 corresponds to the surface of the polycrystalline cBN.

An indentation 21 is present on the surface of the polycrystalline cBN. Indentation 21 has a substantially rhombic shape. Each side of indentation 21 may be curved inward. The curvature is presumed to be a trace of elastic recovery. Second length (d2) is the length of the longer diagonal of indentation 21. In an optical microscopic image, second length (d2) is measured. Second length (d2) is valid to the first decimal place. The value is rounded off to the first decimal place.

Conventionally, it has been presumed that indentation 21 only is a permanent deformation formed by indenter 10. According to a new finding of the present disclosure, a streaky indentation 22 formed on the outside of indentation 21 is present. Streaky indentation 22 extends from both ends of the diagonal of indentation 21 toward the outside of indentation 21. Streaky indentation 22 cannot be observed with an optical microscope. Streaky indentation 22 can be observed by a field emission scanning electron microscope (FE-SEM). An FE-SEM has a high resolution.

The surface of a polycrystalline cBN is precisely observed by FE-SEM. In other words, the surface of a polycrystalline cBN is observed by FE-SEM at a magnification of no less than 5000 times and no more than 10000 times. In the FE-SEM image, the length (s1+s2) of streaky indentation 22 is measured. The length of streaky indentation 22 is valid to the first decimal place. The value is rounded off to the first decimal place.

First length (d1) is the sum of second length (d2) and length (s1+s2) of streak indentation 22. In other words, first length (d1) is calculated by the following expression (1):

$$d1=d2+s1+s2 \qquad \text{Expression (1)}$$

Lengths (s1, s2) of the respective line segments constituting the length of streaky indentation 22 may be equal to each other or different from each other.

It is presumed that streaky indentation 22 is also a permanent deformation. It is presumed that the deformation caused by indenter 10 is reduced by the elastic recovery of the polycrystalline cBN. It is presumed that streaky indentation 22 is a deformation that has become reduced in size to an extent that cannot be observed by an optical microscope.

It is presumed that ratio (d2/d1) of second length (d2) to first length (d1) reflects the level of the elastic limit in the x-axis direction in FIG. 2. It is presumed that the smaller the ratio (d2/d1), the higher the elastic limit is.

Ratio (d2/d1) is valid to the second decimal place. The value is rounded off to the second decimal place. For example, when the calculation result of ratio (d2/d1) is "0.992", ratio (d2/d1) is presumed to be "0.99".

In a conventional polycrystalline cBN, ratio (d2/d1) is substantially 1.00. In other words, it is presumed that a conventional polycrystalline cBN hardly elastically deforms in the x-axis direction in FIG. 1. However, it is conceivable that some elastic deformation occurs in the y-axis direction of FIG. 1.

In the polycrystalline cBN in the present embodiment, ratio (d2/d1) is 0.99 or less. In other words, it is presumed that the polycrystalline cBN in the present embodiment is elastically deformed to some extent in the x-axis direction in FIG. 2. With ratio (d2/d1) of 0.99 or less, the crack resistance can be improved. With ratio (d2/d1) of more than 0.99, sufficient crack resistance cannot be expected.

The crack resistance may be further improved with decrease in ratio (d2/d1). Ratio (d2/d1) may be, for example, 0.98 or less, 0.96 or less, 0.94 or less, 0.92 or less, 0.91 or less, or 0.90 or less.

The lower limit of ratio (d2/d1) should not be particularly limited. Ratio (d2/d1) may be, for example, 0.70 or more. With ratio (d2/d1) of 0.70 or more, for example, the processing accuracy of a cutting tool may be improved. The reason is presumed that the deformation of the cutting edge is reduced because the polycrystalline cBN is appropriately undeformable. Ratio (d2/d1) may be, for example, 0.80 or more, 0.81 or more, 0.82 or more, or 0.83 or more.

(First Knoop Hardness)

Conventionally, the measured value in a Knoop hardness test is a second Knoop hardness. The second Knoop hardness is calculated by the following expression (2).

$$\text{Second Knoop hardness}=1.451 \times (F/d2^2) \qquad \text{Expression (2)}$$

In expression (2), "F" indicates the test force (4.9 N). "d2" indicates the second length.

The second Knoop hardness is a value calculated from second length (d2). No elastic recovery is taken into consideration in the second Knoop hardness. Therefore, it is presumed that the second Knoop hardness does not accurately indicate the original hardness of a material. The second Knoop hardness is presumed to be a value larger than the original Knoop hardness.

In the present embodiment, the first Knoop hardness is calculated by the following expression (3). The first Knoop hardness is valid to the first decimal place. The value is rounded off to the first decimal place.

$$\text{First Knoop hardness}=1.451 \times (F/d12) \qquad \text{Expression (3)}$$

In expression (3), "F" indicates the test force (4.9 N). "d1" indicates the first length.

The first Knoop hardness is a value calculated from first length (d1). First length (d1) includes length (s1+s2) of streaky indentation 22. In other words, elastic recovery is taken into consideration in the first Knoop hardness. It is presumed that the first Knoop hardness reflects the original hardness of a material.

The first Knoop hardness may be, for example, 40 GPa or more and less than 54 GPa. With a first Knoop hardness of 40 GPa or more, for example, in the case of using the polycrystalline cBN for the cutting edge of a cutting tool, it is expected that the abrasion of the cutting edge is reduced. With a first Knoop hardness of less than 54 GPa, for example, in the case of using the polycrystalline cBN for the cutting edge of a cutting tool, it is expected that the chipping of the cutting edge is reduced. Further, with a first Knoop hardness of less than 54 GPa, it is expected that the polycrystalline cBN can be easily processed into various shapes. In other words, use of the polycrystalline cBN can be expanded. The first Knoop hardness may be, for example, 44.0 GPa or more, or 44.9 GPa or more. The first Knoop hardness may be, for example, 53.8 GPa or less, or 52.3 GPa or less.

(X-Ray Diffraction Pattern)

The chemical composition of the polycrystalline cBN in the present embodiment can be identified, for example, by an X-ray diffraction (XRD) pattern.

The XRD pattern of the polycrystalline cBN in the present embodiment includes substantially no diffraction peak derived from a component other than cBN. The "diffraction peak derived from a component other than cBN" has an integrated intensity of more than 0.1 times the total integrated intensity of each diffraction peak derived from cBN.

The XRD pattern of a polycrystalline cBN can be measured by the following methods.

First, a test piece is prepared. A polished surface is formed by polishing the polycrystalline cBN. For example, the polycrystalline cBN may be polished with a grindstone made of cBN. The polished surface is an incident surface for receiving X-rays.

An XRD apparatus is prepared. For example, an XRD apparatus "MiniFlex 600" manufactured by Rigaku Corporation may be used. However, the XRD apparatus is only an example. Another XRD apparatus may be used as long as it has the same function as the XRD apparatus.

The measurement conditions in the XRD apparatus may be, for example, as follows.

Characteristic X-ray: CuKα (wavelength: 0.154 nm)
Tube voltage: 45 kV
Tube current: 40 mA
Filter: multilayer mirror Optical system: concentration method
Scan method: 2θ-θ scan
Measurement range: 20° to 80°
Step width: 0.1°
Scan speed: 3°/min (Average Particle Size of cBN Particle Group)

The polycrystalline cBN in the present embodiment includes a cBN particle group. The cBN particle group is an aggregate of a plurality of cBN particles. The individual cBN particles included in the cBN particle group are directly bonded to each other. The cBN particle group may have, for example, an average particle size of 100 nm or less. Since the cBN particle group has an average particle size of 100 nm or less, for example, improvement in the crack resistance of polycrystalline cBN can be expected. The smaller the average particle size of the cBN particle group, the larger the grain boundary area in the polycrystalline cBN can be. At the grain boundary, inhibition of crack growth is expected.

Further, since the cBN particle group has an average particle size of 100 nm or less, for example, improvement of the processing accuracy is expected when the polycrystalline cBN is used for the cutting edge of a cutting tool. The cBN particle group may have, for example, an average particle size of 95 nm or less, an average particle size of 80 nm or less, or an average particle size of 45 nm or less, an average particle size of 30 nm or less, an average particle size of 25 nm or less, an average particle size of 20 nm or less, or an average particle size of 10 nm or less.

The cBN particle group may have an average particle size of, for example, 1 nm or more. Since the cBN particle group has an average particle size of 1 nm or more, for example, improvement of mechanical strength of the polycrystalline cBN is expected. The cBN particle group may have an average particle size of, for example, 10 nm or more, or may have an average particle size of 20 nm or more.

The average particle size of the cBN particle group is measured by a "cutting method".

First, a test piece is prepared. The surface of the polycrystalline cBN is mirror-finished. For example, mirror finishing is performed with a diamond wheel or the like. Through observation of the mirror-finished surface by FE-SEM, an FE-SEM image is acquired. The observation magnification is 30000 times.

Three FE-SEM images are prepared. The three FE-SEM images are obtained from different sites in the test piece.

A circle is drawn in the FE-SEM image. Eight straight lines are drawn radially starting from the center of the circle. Each straight line extends from the center of the circle to the circumference. The angles formed by two adjacent straight lines of the eight straight lines are all substantially equal. The size of the circle is adjusted. The size of the circle is adjusted such that the number of cBN particles crossed by one straight line is no less than 10 and no more than 50.

Grain boundaries that each of the straight lines crosses are counted. The "grain boundary" indicates a boundary between two particles adjacent to each other. An "average intercept length" is calculated by dividing the total length of the eight straight lines by the total number of grain boundaries.

By multiplying the average intercept length by "1.128", the average particle size in one FE-SEM image is calculated. The average particle size is calculated for each of the three FE-SEM images. The arithmetic mean of the three average particle sizes is regarded as the "average particle size of the cBN particle group" in the entire polycrystalline cBN.

(Average Aspect Ratio of cBN Particle Group)

The cBN particle group may have an average aspect ratio of 1 or more and less than 4. With an average aspect ratio of 1 or more and less than 4, for example, reduction in the occurrence of fine cracks is expected.

The "average aspect ratio" is the arithmetic mean of the aspect ratios of ten cBN particles. The ten cBN particles are randomly sampled from the cBN particle group. The aspect ratio of each cBN particle is calculated by the following expression (4).

$$\text{Aspect ratio} = a/b \qquad \text{Expression (4)}$$

In the expression, "a" indicates the major axis of the cBN particle. "b" indicates the minor axis of the cBN particles.

Each of the major axis and the minor axis is measured in the FE-SEM image. The "major axis" indicates the length of a line segment connecting the two most distant points on the contour line of the cBN particle. The "minor axis" indicates the length of the longest line segment among the line segments orthogonal to the line segment defining the major axis, having two end points on the contour line of the cBN particle.

(Impurity)

The polycrystalline cBN in the present embodiment may contain impurities in addition to the cBN particle group. The impurities may be, for example, those contained in a starting material. The impurities may be, for example, oxygen and the like. In some embodiments, the impurity concentration in the polycrystalline cBN may be substantially equal to the impurity concentration in the starting material. The impurity concentration in the polycrystalline cBN may be, for example, 0.10 mass % or less, 0.05 mass % or less, 0.03 mass % or less, or less than 0.01 mass %.

It is presumed that the less the impurities are, the higher the density of dangling bonds on the surface of the cBN particle is. It is presumed that the more the impurities are, the lower the density of dangling bonds is. The reason is that the dangling bond is terminated with the impurity.

Due to the high density of dangling bonds on the surface of the cBN particle, it is expected that the dangling bonds are coupled with each other between two adjacent cBN particles. Thereby, it is expected that the binding force between the cBN particles is enhanced. As a result, the elastic limit of the polycrystalline cBN may be increased.

(Crack Initiation Load)

The polycrystalline cBN in the present embodiment has excellent crack resistance. The crack resistance may be evaluated by the crack initiation load. It is presumed that the larger the crack initiation load is, the better the crack resistance is. The polycrystalline cBN in the present embodiment may have a crack initiation load of, for example, 30 N or more. It is expected that the larger the crack initiation load is, the less the occurrence of chipping of the cutting edge is, for example, in the case of using the polycrystalline cBN for the cutting edge of a cutting tool. The crack initiation load may be, for example, 40 N or more, 50 N or more, or 65 N or more. The upper limit of the crack initiation load should not be particularly limited. The polycrystalline cBN in the present embodiment may have a crack initiation load of, for example, 80 N or less.

The crack initiation load may be measured by the following method.

An indenter is prepared. The indenter is spherical. The indenter has a radius of 200 μm. The indenter is made of diamond.

The test temperature is within a range of 23° C.±5° C. A sample piece of the polycrystalline cBN is prepared. The test piece may be processed into a shape and size suitable for the test. The indenter comes into contact with the surface of the sample piece. After contact, the load applied from the indenter to the sample piece increases at a rate of 1 N/s. The occurrence of a crack is detected by an acoustic emission (AE) sensor. The load under which the occurrence of a crack is detected is the "crack initiation load". The crack initiation load is measured 5 times. The arithmetic mean of five measurement results is regarded as the crack initiation load of the polycrystalline cBN.

<Method for Producing Polycrystalline cBN>

The polycrystalline cBN in the present embodiment may be produced, for example, by the following production method. In the method for producing the polycrystalline cBN in the present embodiment, various conditions are adjusted and combined such that ratio (d2/d1) is 0.99 or less.

Figure 3:
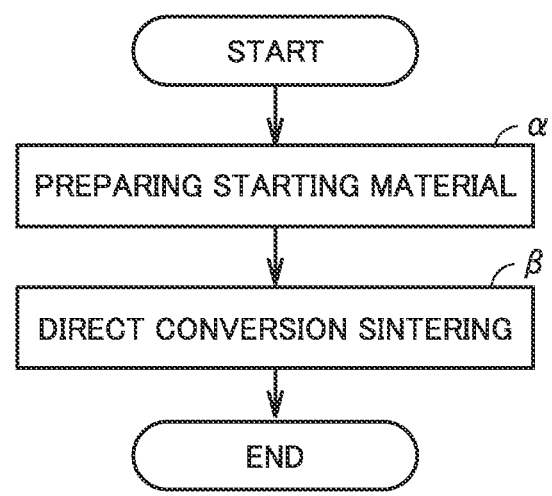
FIG. 3 is a schematic flow chart for illustrating a method for producing the polycrystalline cBN in the present embodiment.

FIG. 3 is a schematic flow chart for illustrating a method for producing the polycrystalline cBN in the present embodiment. The method for producing the polycrystalline cBN in the present embodiment includes "(α) providing starting material" and "(β) direct conversion sintering".

"(α) Preparing Starting Material"

The method for producing the polycrystalline cBN in the present embodiment includes preparing a starting material.

The starting material may be a boron nitride (BN) material. The BN material is in the form of non-cubic boron nitride (cBN). The term "in the form of non-cBN" means that the material is not cBN. The BN material in the form of non-cBN may be, for example, hexagonal boron nitride (hBN). The starting material may be, for example, powder. The starting material may be molded into, for example, a predetermined shape. In other words, a molded product as starting material may be prepared.

In some embodiments, the starting material may have a degree of graphitization of 0.6 or less. Thereby, the elastic limit of the polycrystalline cBN may be increased. The degree of graphitization is calculated by the following Expression (5).

$$d_{002}=3.33P1+3.47(1-P1) \quad \text{Expression (5)}$$

In expression (5), "P1" indicates the degree of graphitization. "$d_{002}$" indicates an interplanar spacing between (002) planes in the starting material (BN material). From the XRD pattern of the BN material, "$d_{002}$" is specified.

The degree of graphitization is originally an index value indicating the degree of similarity between the ideal graphite structure and the crystal structure of a carbon material. It is presumed that the higher the degree of graphitization is, the closer to the ideal graphite structure. A BN material can also have a graphite-like crystal structure. Accordingly, the crystal structure of the BN material may also be evaluated depending on the degree of graphitization.

For example, a BN material in the form of non-cBN may be synthesized by a thermal decomposition method from a high-purity gas as raw material. Hereinafter, the BN material in a form of non-cBN synthesized by the thermal decomposition method is referred to as "pBN (pyrolytic boron nitride)". The pBN can have a degree of graphitization of 0.6 or less. Further, the pBN can have an impurity concentration of 1 mass ppm or less. The impurities can be, for example, hydrogen, oxygen, nitrogen and the like. Here, nitrogen as an impurity means, for example, nitrogen bonded to an element other than boron (hydrogen, oxygen, etc.).

The starting material should not be limited to pBN. For example, a starting material may be prepared by pulverizing hBN in a high-purity inert gas atmosphere. For example, an amorphous BN (hereinafter, also referred to as "aBN (amorphous boron nitride)") may be used. The aBN may be subjected to a high-purity purification treatment. A spherical BN may be used. An onion-like BN may be used.

The above various materials may be used alone as a starting material. A mixture of multiple materials may be used as a starting material.

In the present embodiment, the starting material is directly converted to cBN. It is expected that the lower the impurity concentration in the starting material is, the more the phase conversion to cBN is facilitated. Facilitation of phase conversion may, for example, increase the elastic limit of the polycrystalline cBN.

Impurities may be, for example, oxygen and the like. The oxygen concentration in the starting material can be measured, for example, by the inert gas melting-infrared absorption method. The oxygen concentration in the starting material may be, for example, 0.10 mass % or less, 0.05 mass % or less, 0.03 mass % or less, or less than 0.01 mass %.

((β) Direct Conversion Sintering)

The method for producing the polycrystalline cBN in the present embodiment includes producing polycrystalline cBN by directly converting the starting material into a cBN particle group and sintering the cBN particle group.

A capsule is prepared. The capsule accommodates the starting material. The capsule may be made of, for example, a high-melting point metal. The high-melting point metal can withstand the high temperature environment during cBN synthesis. The capsule may be made of, for example, tantalum (Ta). Alternatively, the capsule may be made of, for example, niobium (Nb).

The starting material is accommodated in a capsule. After accommodation, the capsule is heated in vacuum. By heating in vacuum, the gas (air, etc.) adsorbed on the starting material can be reduced. The adsorbed gas can be a source of impurities. After heated in vacuum, the capsule is sealed. The capsule after sealing is placed in the cell of a high pressure and high temperature apparatus.

In the high pressure and high temperature apparatus, the phase conversion of the starting material and the sintering of the cBN particle group can proceed substantially at the same time. The high pressure and high temperature apparatus should not be particularly limited as long as the starting material can be phase-converted and sintered. The high pressure and high temperature apparatus may be, for example, a belt type. Alternatively, the high pressure and high temperature apparatus may be, for example, a multi-anvil type. The belt type and the multi-anvil type have good productivity and workability FIG. 4 is a graph showing synthesis conditions in some embodiments.

Figure 4:
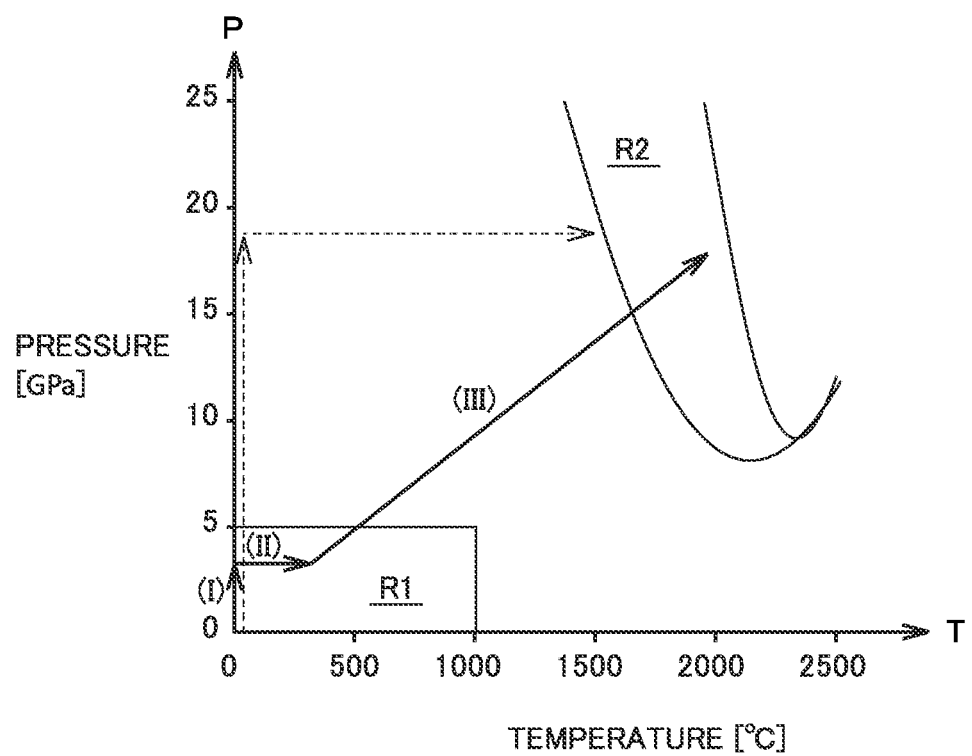
FIG. 4 is a graph showing synthesis conditions in some embodiments.

The horizontal axis (T) in FIG. 4 indicates the temperature (unit: ° C.). The vertical axis (P) in FIG. 4 indicates the pressure (unit: GPa).

A first region (R1) in FIG. 4 satisfies the following conditions:

$T \leq 1000$, and $P \leq 5$.

A second region (R2) in FIG. 4 satisfies the following conditions:

$P \geq 0.0000294T^2 - 0.126T + 143$, and $P \leq 0.000105T^2 - 0.491T + 583$.

For example, pressure rising and temperature rising may be performed in the following order. Thereby, the elastic limit of the polycrystalline cBN may be increased.

(I) The pressure (P) rises in the first region (R1).

(II) The temperature (T) rises in the first region (R1).

(III) By simultaneously raising the pressure (P) and the temperature (T), the pressure and temperature in first region (R1) reach the pressure and temperature in second region (R2).

The pressure and temperature in second region (R2) are maintained for, for example, 1 minute or more. Thereby, polycrystalline cBN can be synthesized. The holding time period may be, for example, no less than 5 minutes and no more than 20 minutes, or no less than 10 minutes and no more than 20 minutes.

In the case where the final pressure and temperature deviate from second region (R2) to the higher temperature side, the cBN particle may become coarse regardless of the pressure. As a result, the elastic limit of the polycrystalline cBN may decrease.

In the case where the final pressure and temperature deviate from second region (R2) to the lower temperature side, the sinterability may decrease regardless of the pressure. Due to the decrease in sinterability, the binding force between cBN particles may decrease. As a result, the elastic limit of the polycrystalline cBN may decrease.

<Tool>

A tool in the present embodiment includes the polycrystalline cBN in the present embodiment. The polycrystalline cBN in the present embodiment is hard and has excellent crack resistance. Accordingly, the tool in the present embodiment may have, for example, excellent chipping resistance. The tool in the present embodiment may have, for example, excellent abrasion resistance.

The tool in the present embodiment should not be particularly limited, as long as it includes the polycrystalline cBN in the present embodiment. The tool in the present embodiment may be, for example, a cutting tool or the like. The cutting tool in the present embodiment may have, for example, excellent processing accuracy. With use of the cutting tool in the present embodiment, for example, it is expected that the occurrence of the diffraction phenomenon in mirror surface finishing is reduced. The "diffraction phenomenon" means that a rainbow pattern appears on the processed surface due to the diffraction of light at cutting marks.

The cutting tool in the present embodiment may be, for example, a cutting tip with a replaceable cutting edge for turning, a cutting tip with a replaceable cutting edge for milling, an end mill, a cutting tip with a replaceable cutting edge for an end mill, a metal saw, a gear cutting tool, a reamer, a tap, and a cutting tool.

The tool in the present embodiment may be, for example, an abrasion resistant tool. The abrasion resistant tool in the present embodiment may be, for example, a die, a scriber, a scribing wheel, and a dresser.

EXAMPLES

Examples of the present disclosure (hereinafter, also referred to as "the present examples") are described as follows. The following description, however, is not intended to limit the claims.

<Production of Polycrystalline cBN>

Each of polycrystalline cBN in Production Examples 1 to 11 was produced.

(($\alpha$) Providing Starting Material)

Each of the starting materials shown in the following Table 1 was prepared. None of the starting materials contains a binder and a sintering aid.

In Production Examples 1 to 7, and Production Example 11, each of the molded products of pBN was prepared.

In Production Example 8 and Production Example 9, each of the molded products of isotropic hBN was prepared. The molded product of hBN material was prepared by sintering high purity hBN powder.

In Production Example 10, a molded product of aBN was prepared. The aBN was synthesized by a solid phase reaction.

The impurity (oxygen) concentration of each starting material was measured by the inert gas melting-infrared absorption method. The measurement results are shown in the column of "impurity (oxygen) concentration" in the following Table 1. The detection limit in the inert gas melting-infrared absorption method in the present example was 0.01 mass %. In the column of "impurity (oxygen) concentration" in the following Table 1, the description "<0.01" indicates that the concentration was less than the detection limit (0.01 mass %).

(($\beta$) Direct Conversion Sintering)

A capsule made of Ta is prepared. The starting material is accommodated in the capsule. The capsule is heated in vacuum. After heated in vacuum, the capsule is sealed. A high pressure and high temperature apparatus is prepared. The sealed capsule is disposed in the cell of the high pressure and high temperature apparatus.

In Production Examples 1 to 10, the following processing was performed.

First, the pressure was raised to 3 GPa. The temperature was then raised to 300° C. Further, the pressure and the temperature were raised at the same time. Thereby, the pressure reached the value shown in the column of synthesis conditions in the following Table 1. At the same time, the temperature reached the value shown in the column of synthesis conditions in the following Table 1. The pressure and the temperature were maintained for 15 minutes at the values shown in the synthesis conditions column of the following Table 1.

In Production Example 11, the following processing was performed.

First, the pressure was raised to 18 GPa. The temperature was then raised to 1500° C. A pressure of 18 GPa and a temperature of 1500° C. were maintained for 15 minutes.

From the above, a polycrystalline cBN was produced.

In FIG. 4, the solid arrows conceptually show the transition of pressure and temperature in Production Examples 1 to 10. The dotted arrows conceptually show the transition of pressure and temperature in Production Example 11.

The end points in Production Examples 1 to 6 and Production Examples 8 (pressures and temperatures shown in the column of synthesis conditions in the following Table 1) are present within second region (R2).

The end points in Production Example 7, Production Example 9, Production Example 10 and Production Example 11 are present outside second region (R2). The end points in Production Example 7 and Production Example 9 deviate from second region (R2) toward the higher temperature side. The end points in Production Example 10 and Production Example 11 deviate from second region (R2) toward the lower temperature side.

<Evaluation>

(Polycrystalline cBN)

By the above-mentioned methods, "average particle size of cBN particle group", "ratio (d2/d1)", "first Knoop hardness", "second Knoop hardness", and "crack initiation load" were measured, respectively. The measurement results are shown in the following Table 1.

(Tool Performance)

A test tool was produced from polycrystalline cBN. The test tool in the present example is a ball end mill. The tip diameter of the ball end mill is 0.5 mm. As a work, hardened steel "ELMAX (Rockwell hardness 60)" was prepared. The end face of the work was subjected to mirror finish cutting with the test tool. The cutting conditions were as follows.

Rotation speed: 60000 rpm
Cutting speed: 200 mm/min
Processing length: 5 μm
Cutting width: 3 μm
Processing area: 20 mm² (=4 mm×5 mm)

After processing, the presence or absence of chipping was determined at the cutting edge of the test tool. The determination results are shown in the column of "cutting edge chipping" in the following Table 1. The "chipping" in the present examples indicates any one of "a recess having a width of 0.1 mm or more", "a recess having a depth of 0.01 μm or more", and "a recess having a width of 0.1 mm or more and a depth of 0.01 μm or more".

After processing, the abrasion loss was measured at the cutting edge of the test tool. The measurement results are shown in the column "abrasion loss" in the following Table 1. Meaning of descriptions "large", "medium", and "small" in the column "abrasion loss" in the following Table 1 are as follows.

"Large": 20 μm<abrasion loss
"Medium": 5 μm<abrasion loss≤20 μm
"Small": 0 μm≤abrasion loss≤5 μm After processing, the surface roughness of the processed surface of the work was measured. The surface roughness was measured with a laser microscope. The surface roughness in the present examples indicates the arithmetic mean roughness (Ra) in "JIS B 0601: 2013". The measurement results are shown in the column "Arithmetic mean roughness (Ra)" in the following Table 1. In the column "Arithmetic mean roughness (Ra)" in the following Table 1, for example, the description "10-20" indicates that the arithmetic mean roughness is 10 μm to 20 μm. It is presumed that the smaller the arithmetic mean roughness (Ra) is, the higher the processing accuracy of the test tool is.

<Result>

As shown in Table 1 described above, in Production Examples with a ratio (d1/d2) of 0.99 or less, a larger crack initiation load was obtained than in Production Examples without satisfaction of the same conditions.

It should be considered that the present embodiments and the present examples are exemplary in all respects and are not restrictive. The scope of the present disclosure is indicated by the claims rather than the present embodiments and the present examples described above, and is intended to include meaning equivalent to the claims and all modifications within the scope.

REFERENCE SIGNS LIST

10: indenter, 20: test piece, 21: indentation, 22 streaky indentation

The invention claimed is:
1. A polycrystalline cubic boron nitride comprising:
a cubic boron nitride particle group wherein
the polycrystalline cubic boron nitride has a ratio of a second length to a first length of 0.99 or less,
each of the first length and the second length is a value measured on a surface of the polycrystalline cubic boron nitride with an indentation formed by a Knoop hardness test under conditions specified in ISO4545-1 and ISO4545-4,
the test force of the Knoop hardness test is 4.9 N,
the second length represents the length of the longer diagonal of the indentation,
the first length represents the sum of the second length and the length of a streaky indentation,
the streaky indentation extends from both ends of the longer diagonal of the indentation toward the outside of the indentation,
the length of the streaky indentation is measured by observing the surface of the polycrystalline cubic boron nitride with a field emission scanning electron microscope at a magnification of no less than 5000 times and no more than 10000 times, and

TABLE 1

List of production example

| | | Starting material | | Synthesis condition | | Polycrystalline cBN | | | | | | Crack resistance | Tool performance | | |
|---|---|---|---|---|---|---|---|---|---|---|---|---|---|---|---|
| | | Degree of graphitization (P1) | Impurity (oxygen) concentration | Pressure (P) | Temperature (T) | Average particle size of cBN particle group | First length (d1) | Second length (d2) | Ratio (d2/d1) | First Knoop hardness | Second Knoop hardness | Crack initiation load | Cutting edge chipping | Abrasion loss | Arithmetic mean roughness (Ra) |
| Production example | Type | [—] | [mass %] | [GPa] | [° C.] | [nm] | [μm] | [μm] | [—] | [GPa] | [GPa] | [N] | — | — | [μm] |
| 1 | pBN | 0.24 | <0.01 | 18 | 1600 | 25 | 39.4 | 37.0 | 0.94 | 44.9 | 50.9 | 30 | absent | small | 10-20 |
| 2 | pBN | 0.40 | <0.01 | 18 | 1600 | 30 | 39.8 | 36.0 | 0.91 | 44.0 | 53.8 | 33 | absent | small | 10-20 |
| 3 | pBN | 0.54 | <0.01 | 18 | 1600 | 45 | 38.0 | 35.0 | 0.92 | 48.3 | 56.9 | 50 | absent | small | 10-20 |
| 4 | pBN | 0.65 | <0.01 | 18 | 1600 | 10 | 37.0 | 32.0 | 0.87 | 50.9 | 68.1 | 80 | absent | Small | 10-20 |
| 5 | pBN | 0.65 | <0.01 | 18 | 2000 | 30 | 36.5 | 30.0 | 0.82 | 52.3 | 77.5 | 65 | absent | Small | 10-20 |
| 6 | pBN | 0.75 | <0.01 | 18 | 1600 | 20 | 36.0 | 29.0 | 0.81 | 53.8 | 82.9 | 40 | absent | small | 10-20 |
| 7 | pBN | 0.75 | <0.01 | 12 | 2400 | 80 | 35.0 | 29.0 | 0.83 | 56.9 | 82.9 | 40 | present | medium | 20-30 |
| 8 | hBN | 0.98 | 0.05 | 10 | 2100 | 95 | 39.3 | 39.0 | 0.99 | 45.1 | 45.8 | 32 | absent | small | 20-30 |
| 9 | hBN | 0.98 | 0.05 | 10 | 2300 | 230 | 38.0 | 38.0 | 1.00 | 48.3 | 48.3 | 24 | present | medium | 20-30 |
| 10 | aBN | 0 | 0.30 | 8 | 1600 | 20 | 48.0 | 48.0 | 1.00 | 30.3 | 30.3 | 10 | absent | large | 30-50 |
| 11 | pBN | 0.54 | <0.01 | 18 | 1500 | 40 | 38.0 | 37.7 | 0.99 | 48.3 | 49.1 | 30 | present | medium | 20-30 | the second length is measured by observing the surface of the polycrystalline cubic boron nitride with an optical microscope at a magnification of no less than 500 times and no more than 1000 times.

2. The polycrystalline cubic boron nitride according to claim 1, wherein a first Knoop hardness calculated from the first length is 40 GPa or more and less than 54 GPa.

3. The polycrystalline cubic boron nitride according to claim 1, wherein the cubic boron nitride particle group has an average particle size of 100 nm or less.

4. A tool comprising the polycrystalline cubic boron nitride according to claim 1.

5. The polycrystalline cubic boron nitride according to claim 1, wherein the cubic boron nitride particle group has an average particle size of 1 nm or more and 100 nm or less.

6. The polycrystalline cubic boron nitride according to claim 1, wherein the cubic boron nitride particle group has an average particle size of 10 nm or more and 80 nm or less.

7. The polycrystalline cubic boron nitride according to claim 1, wherein the cubic boron nitride particle group has an average particle size of 1 nm or more and 45 nm or less.

8. The polycrystalline cubic boron nitride according to claim 1, wherein the cubic boron nitride particle group has an average particle size of 1 nm or more and 30 nm or less.

9. The polycrystalline cubic boron nitride according to claim 1, wherein the cubic boron nitride particle group has an average particle size of 20 nm or more and 95 nm or less.

10. The polycrystalline cubic boron nitride according to claim 1, wherein the polycrystalline cubic boron nitride has the ratio of the second length to the first length of 0.92 or less.

11. The polycrystalline cubic boron nitride according to claim 1, wherein a second Knoop hardness calculated from the second length is 56.9 GPa or more.

* * * * *